(12) United States Patent
Liang

(10) Patent No.: US 6,401,886 B1
(45) Date of Patent: Jun. 11, 2002

(54) HYDRAULIC OIL CYLINDER STRUCTURE WITH REVERSE FORCE FUNCTION

(75) Inventor: Wang So Liang, Taipei Hsien (TW)

(73) Assignee: Eng Gen Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 09/761,620

(22) Filed: Jan. 18, 2001

(51) Int. Cl.⁷ ................................................. F16F 9/36
(52) U.S. Cl. .................... 188/322.17; 267/225; 267/226
(58) Field of Search ........................... 188/322.17, 311; 267/225, 226; 482/51, 52, 70, 72, 112, 131

(56) References Cited

U.S. PATENT DOCUMENTS 4,342,884 A * 8/1982 Ban ............................ 200/34
5,888,175 A * 3/1999 Chang ......................... 482/53

* cited by examiner

Primary Examiner—Paul N. Dickson
Assistant Examiner—C. T. Bartz

(57) ABSTRACT

The invention herein relates to a hydraulic oil cylinder structure with reverse force function comprises of a piston rod with one threaded end and ring base on the other end; the piston rod is housed in order with a elastic cushion, a cover body, a cushioning circle, a spring, a spring fastening member, a tension spring, a cushioning ring and a piston; when the piston rod is stepped downwards for physical exercise, the piston rod can resume automatically by the reverse force function of the tension spring to allow the exerciser to choose to operate by exercising with single foot, both feet up or both feet down.

2 Claims, 4 Drawing Sheets

HYDRAULIC OIL CYLINDER STRUCTURE WITH REVERSE FORCE FUNCTION

BACKGROUND OF THE INVENTION

1) Field of the Invention

The invention herein relates to a hydraulic oil cylinder structure with reverse force function to be mounted to the physical training devices such as the climbing exerciser or the pulling exerciser.

2) Description of the Prior Art

The physical training devices have become very popular merchandises in the modem society. Everybody wishes to set up one either at home or in the office area for exercising during break or leisure time to improve the working efficiency or increase the lung capacity. It is not exaggerate to say that the physical training devices are the necessities in the life of the modern people. Therefore, the safety and the whole structure of those devices require more attention.

Referring to FIG. 1 and 1A, as the conventional climbing exerciser consists of one main body (10), two base plates (11), two cylinders (12), two treadles (13), one pulley (14) and one pulling rope (15), wherein the pulley (14) is mounted at the proper position on the main body (10), with two base plates (11) pivotally and respectively connected on the two sides of the main body (10) in a movable status; a side plate (16) with a hanging ear (17) is connected to the front end portion; the pulling rope (15) goes through the hanging ear (17) and the pulley (14) to create the linkage movement between the two base plates (11); when the user steps on the treadle (13), he has to first step one treadle (13) downwards to make the other one move upwards; in the same way, to step down the elevated treadle (13) to make the treadle (13) on the other side go upwards, thus to achieve the purpose of exercise, however, this structure has a few shortcomings listed as followings which have been neglected usually by the general users:

1. To control the up or down movement of the base plate by the structure of the pulling rope and the pulley may cause the injury if the user's pants are too long as to be caught by the pulling rope and the pulley.
2. To control the up or down movement of the base plate by the structure of the pulling rope and the pulley makes the whole structure become complicated and increases the manufacturing costs
3. It requires both feet to step on the treadles and to use one foot to exert the force first to move the base plate downwards, synchronously, to pull the pulling rope forwards and move the pulling rope on the other end, thus to gradually elevate the base plate upwards; however, it can not be operated by exercising with single foot, both feet up or both feet down.

From the foregoing sections, it is obvious that the conventional climbing exerciser has a few shortcomings neglected by people adapted to it and grew used to it.

In view of the various shortcomings, the inventor of the invention herein, based on the experience gained from manufacturing the related products, has researched through continuous experiments and improvements, culminated in the development of the invention herein.

SUMMARY OF THE INVENTION

The primary objective of the invention herein is to provide a simple machine structure equipped with a hydraulic oil cylinder structure with reverse force function of high safety quality.

Another objective of the invention herein is to provide a physical training device with multiple options for the exerciser to choose to operate by exercising with single foot, both feet up or both feet down.

To enable a further understanding of the features and technological methods, the brief description of the drawings below is followed by the detailed description of the preferred embodiments. However, the drawings are only for references and illustrations, not for limiting any of the scope and spirit of the invention herein.

DETAILED DESCRIPTION OF PREFERRED EMBODIMENTS

Figure 1:
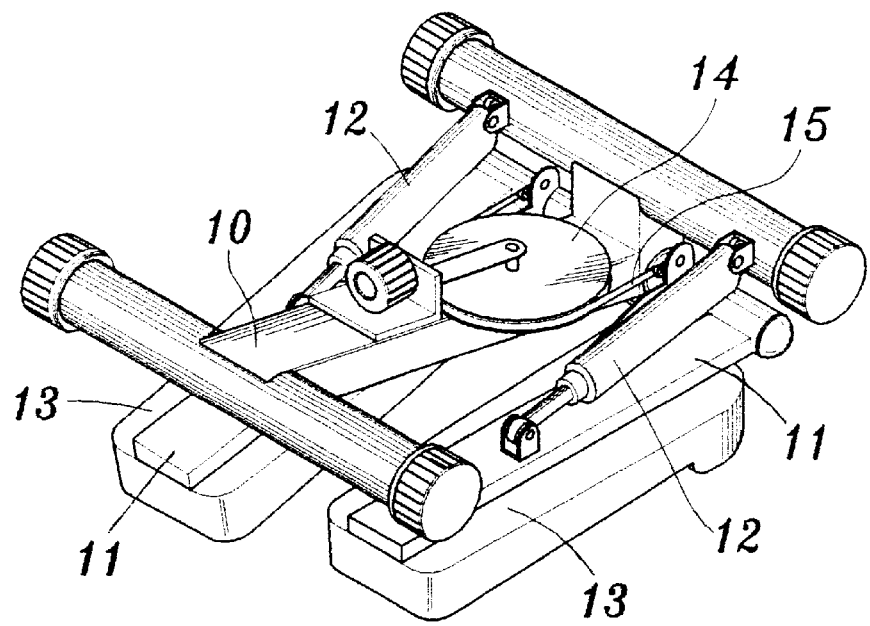
FIG. 1 is a drawing of the bottom and pictorial view of a conventional stepping exerciser.
Figure 1A:
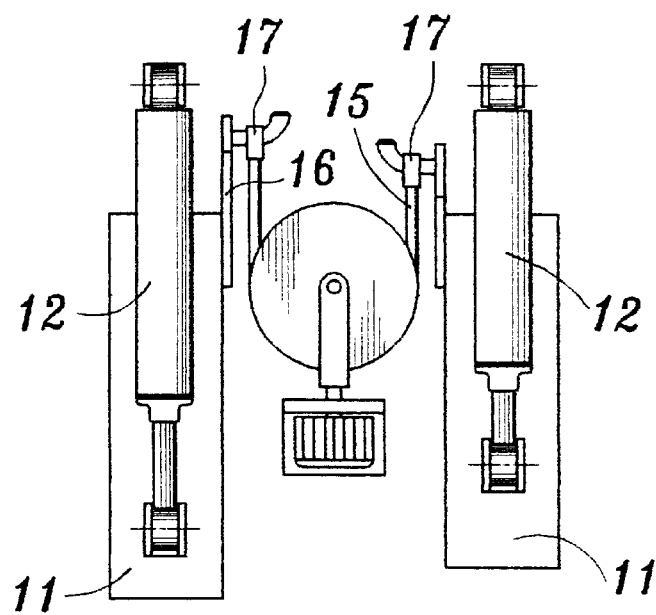
FIG. 1A is a drawing of the bird's-eye view of the conventional stepping exerciser.
Figure 2:
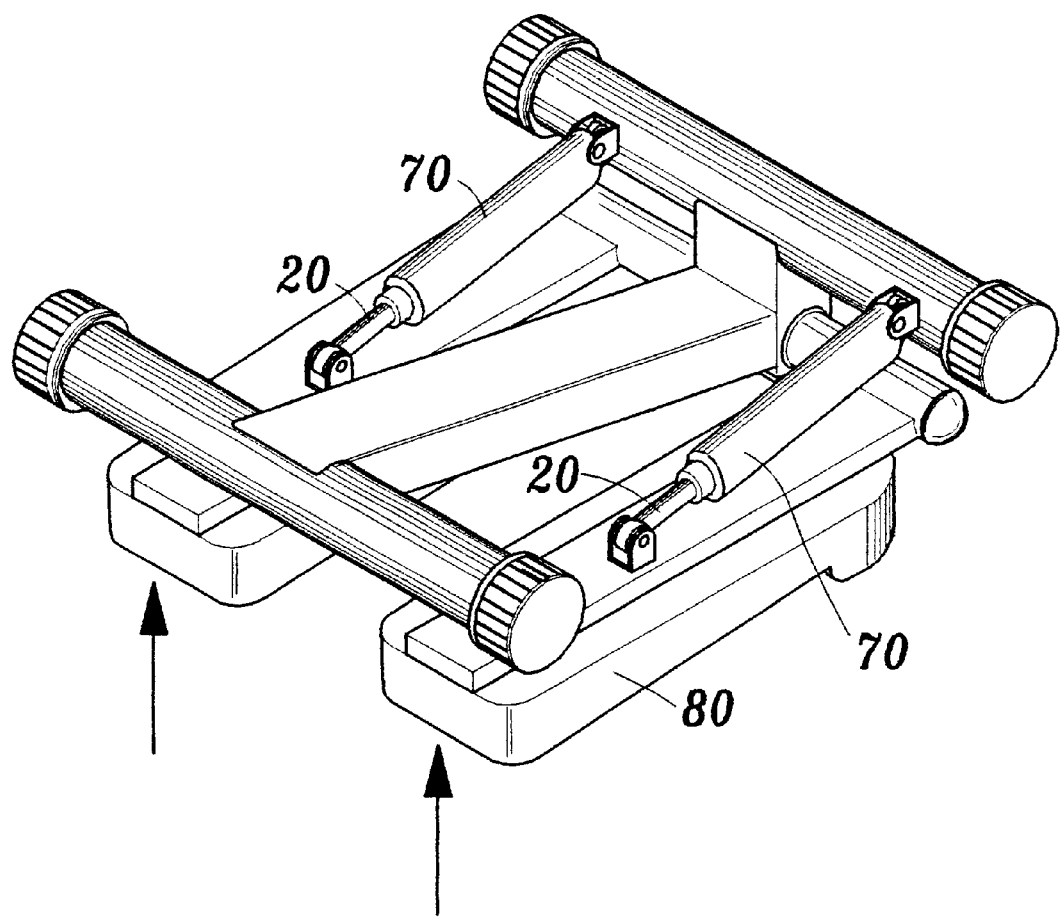
FIG. 2 is an isometric drawing of the invention herein mounted on a stepping exerciser.
Figure 3:
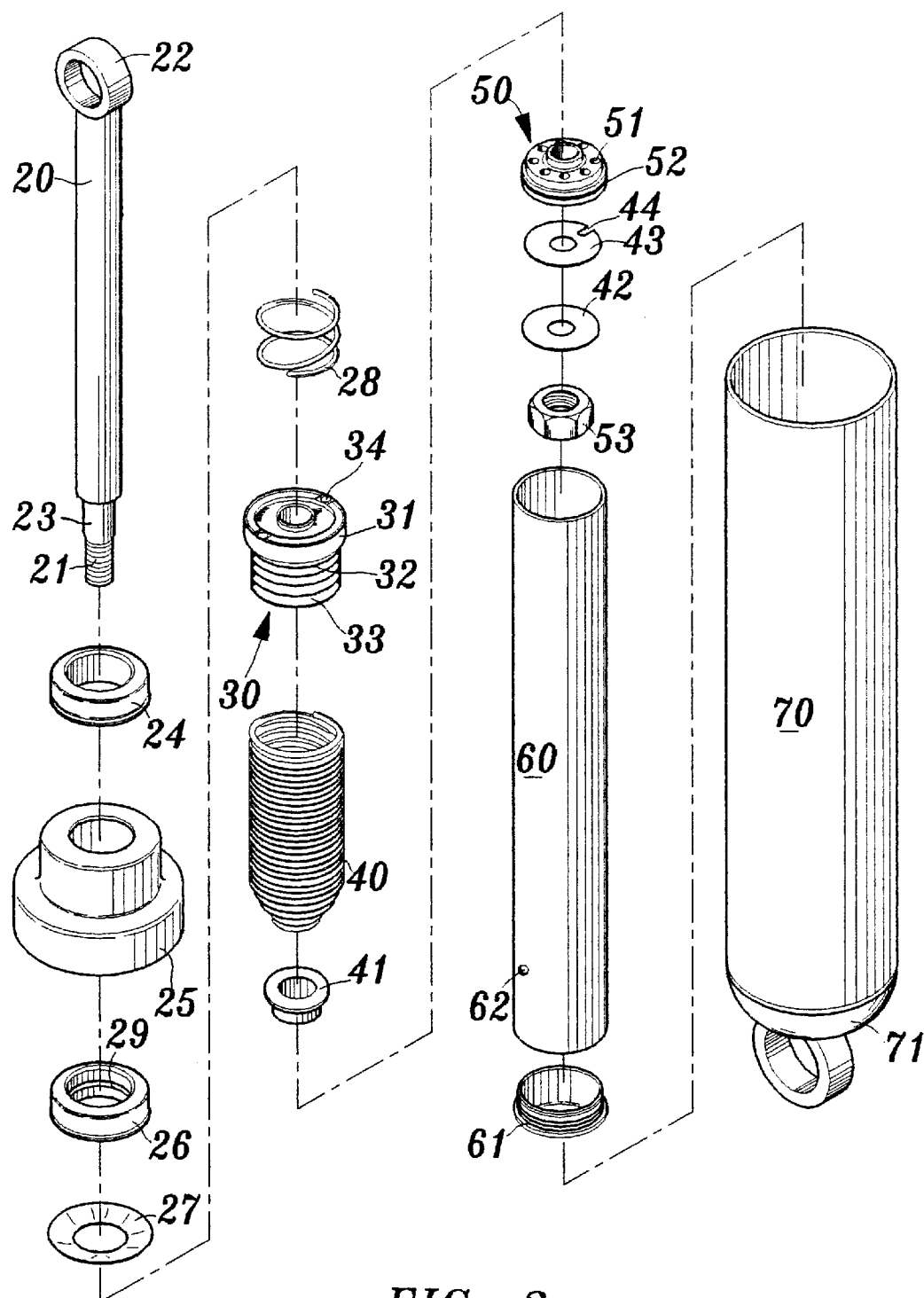
FIG. 3 is a pictorial and exploded drawing of the invention herein.
Figures 4, 5:
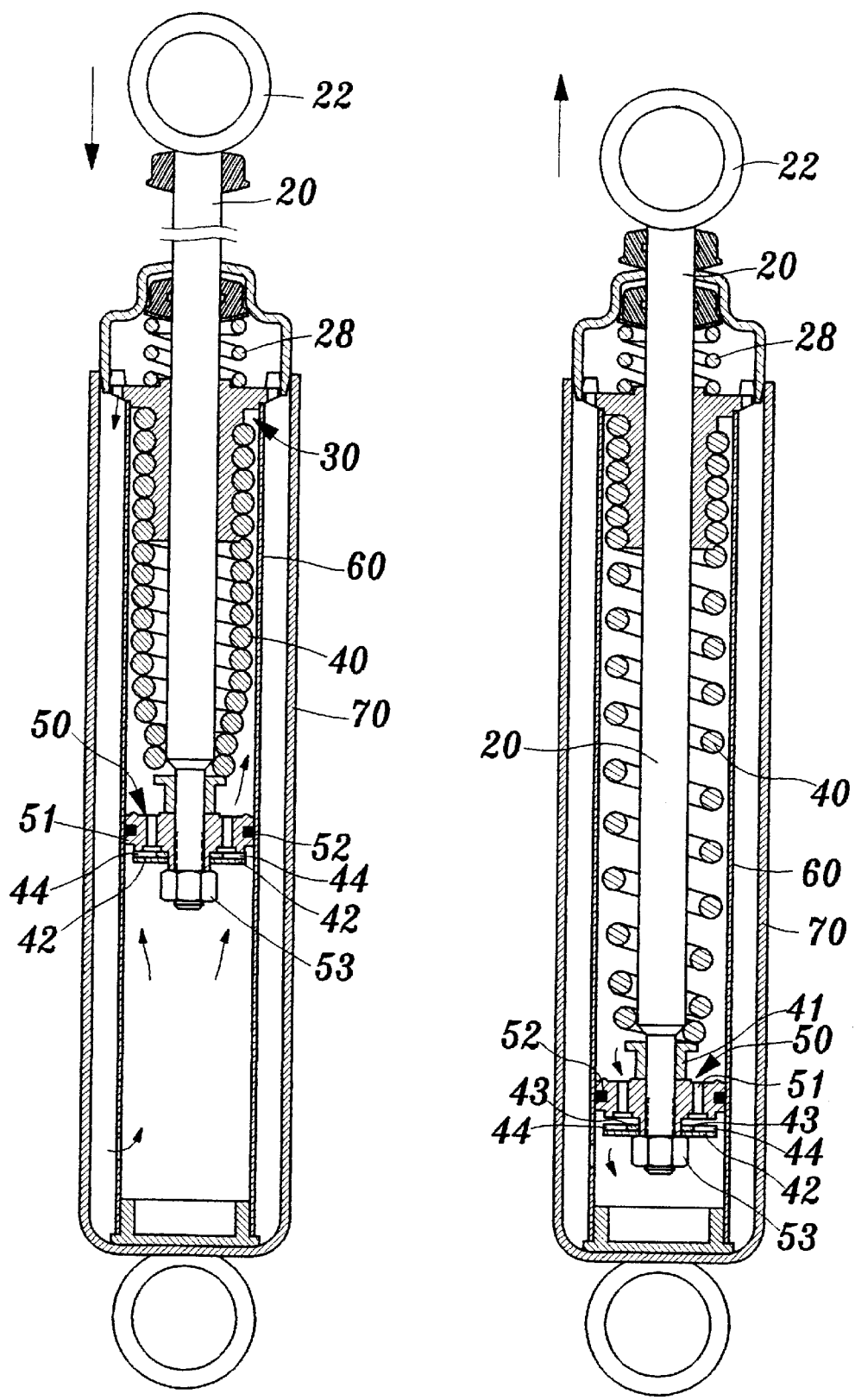
FIG. 4 is a drawing of the sectional view of the invention herein in the status of bearing no exerted force.
FIG. 5 is a drawing of the sectional view of the invention herein in preferred embodiment.

Referring to FIGS. 2, 3 & 4, the invention herein of a hydraulic oil cylinder structure with reverse force function comprises of a piston rod (20) with one threaded end (21) and one ring base (22) on the other end; the piston rod (20) is housed in order with a elastic cushion (24), a cover body (25), a cushioning circle (27), a spring (28), a spring fastening member (30), a tension spring (40), a cushioning ring (41) and a piston (50), wherein:

A elastic cushion (24) is disposed between the ring base (22) and the cover body (25) to avoid hard contact or strike; another elastic cushion (26) is placed inside the top portion of the cover body (25) and tightly pushed by the cushioning circle (27) and the spring (28) to prevent oil leakage; the oil returning grooves (29) are carved on the surface inside the column of the elastic cushion (26) for sending the leaked oil back to the sealed hydraulic oil cylinder when the piston rod (20) is pulled outwards; the function of the cushioning circle (27) is to protect the elastic cushion (26) from being deformed by the spring (28).

One of the end of the spring fastening member (30) is a fastening base (31) welded onto the cover body (25); a flange base (32) and a spring threaded portion (33) extend from the other end of the fastening base (31) with the diameter of the cylinder proximately equals to the internal diameter of the internal housing tube (60) for coupling with each other to prevent oil leakage; the end of the big opening diameter is screwed onto the spring threaded portion (33) and the end of the small opening diameter is housed to the step portion (23) of the piston rod (20); when being stepped downwards for exercising, the piston rod (20) can automatically resume by the reverse force function of the tension spring (40); two opposite oil returning holes (34) are set on the fastening base (31), through them, the leaked oil can return into the external housing tube (70).

The internal diameters of the cushioning ring (41) and the two oil choke plates (42, 43) proximately equal to the diameter of the threaded end (21) on the piston rod (20), wherein the oil choke plate (43) has one or more than one oil openings (44) for controlling the opening and closure of the oil inlets (51) at the low portion of the piston (50).

On the surface of the column of the piston (50), a piston ring (52) tightly contacts with the internal housing tube (60); the opening and closure of a plurality of oil inlets (51) on the piston (50) is controlled by the two oil choke plates (42, 43) and fastened onto the threaded end (21) of the piston rod (20) by the nut (53).

The top end of an internal housing tube (60) with a hollow body is coupled tightly with the flange base (32) of the fastening base (30), while the bottom end connects a seal cover (61); the surface of the column of its terminal end has oil inlets (62); the internal housing tube (60) works as the traveling rail for the piston rod (20) to follow while moving straightly upwards.

The top end of an external housing tube (70) with a hollow body is connected to the cover body (25), while the bottom end is connected to the lower cover body (71) by the techniques of welding and in the status of a sealed hydraulic oil cylinder.

The relative positions in a stationary state of all the members of the assembled invention herein with the tension spring free from the exerted force are shown in FIG. 4. The preferred embodiment of the invention herein in FIG. 2 shows that the force is exerted onto the treadle (80) according to the direction of the arrow to link and move the piston (50) inside the internal housing tube (60); at the same time, the two oil choke plates (42, 43) tightly close the oil inlets (51) of the piston (50) and exert pressure to the oil volume inside the internal housing tube (60), therefore the oil volume inside the internal hosing tube (60) will leak out by the control of the oil opening (44) and the oil inlets (51) via the gaps of the two oil choke plates (42, 43) and via the space between the piston diameter of piston rod (20) and the internal diameter of the spring fastening base (30), then, flow into the external housing tube (70) through the oil returning holes (34) of the spring fastening base (30) and into the internal housing tube (60) through the oil inlets (62) of the internal housing tube (60) to form the cycle of the oil flow course; after the foregoing movement is completed, the tension spring (40) is in the status of being extended by the exerted force; when the force is not exerted on the treadle (80), as shown in FIG. 5, the piston (50) inside the internal housing tube (60) moves backwards, the tension spring gradually resume to the original status, at the same time, the two oil choke plates (42, 43) are in a loose status to allow the oil volume flow into the internal housing tube (60) via the oil inlets (51) and the oil opening (44).

Therefore, by simply mounting the invention herein of a hydraulic oil cylinder structure with reverse force function onto the main body of the stepping exerciser, the user can choose to operate by exercising with single foot, both feet up or both feet down, thus to solve the problems of using linkage structure mounted between the two cylinders of the conventional stepping exerciser, such as the structure of pulley and levels for controlling the up and down movement of the treadles, the using of both feet to control one foot on and the other one down, the not so good safety control and the increased manufacturing costs due to the equipped linkage structure; therefore, the configuration revealed by the invention herein is much better than the conventional structure.

However, the preferred embodiments mentioned above are for detailed description of the objectives, features and functions of the invention herein. It will be appreciated that various modifications and corrections done by the other technicians base on those discussed above, may be restored to without departing from the spirit or scope of the invention; therefore, the protected patent of the invention herein will be described by the following scope of patent application.

What is claimed is:

1. A hydraulic cylinder structure utilizing oil for reverse force function comprising: a piston rod with one threaded end and one ring base on the other end, and a step portion inbetween; and further comprising a first and second elastic cushion, a cover body, a cushioning circle, a first spring, a cushioning ring and a piston; said first elastic cushion being disposed between the said ring base and the said cover body; said second elastic cushion being mounted inside one end portion of the cover body for being pushed tightly by the cushioning circle and the first spring; oil returning grooves being carved on the surface inside of the second elastic cushion for allowing oil to flow into the said hydraulic cylinder structure when the said piston rod is extended, the improvement being:

a spring fastening member with one end welded on the said cover body; and a flange base and a threaded portion extending from the other end; a tension spring having two ends, with one end having an opening diameter and the other end having an opening diameter smaller than the diameter of the one end, said tension spring with its big opening diameter placed onto the said spring portion and said small opening diameter housed near the step portion of the piston rod; for providing the reverse force function.

2. The hydraulic cylinder as defined in claim 1 further having a housing tube within which the piston moves, wherein the diameter of the flange base is approximately equal to the internal diameter of the housing tube.

* * * * *

UNITED STATES PATENT AND TRADEMARK OFFICE
CERTIFICATE OF CORRECTION

PATENT NO. : 6,401,886 B1
DATED : June 11, 2002
INVENTOR(S) : So Liang Wang

It is certified that error appears in the above-identified patent and that said Letters Patent is hereby corrected as shown below:

<u>Title page,</u>
Item [73], should read -- Jeng Gen Industrial Co., Ltd., Taipei Hsien (TW) --.

Signed and Sealed this

Twenty-ninth Day of October, 2002

Attest:

Attesting Officer

JAMES E. ROGAN
*Director of the United States Patent and Trademark Office*